June 13, 1972     D. L. KLASS ET AL     3,669,637
ODORANT REPLACEMENT IN GAS STREAMS
Filed May 8, 1970
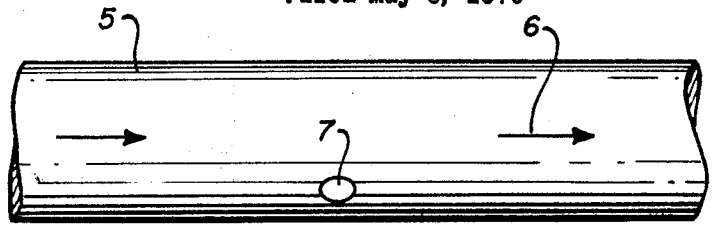
FIG. 1
FIG. 2
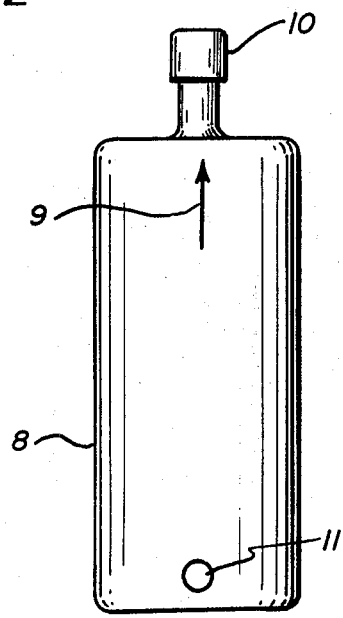
FIG. 3
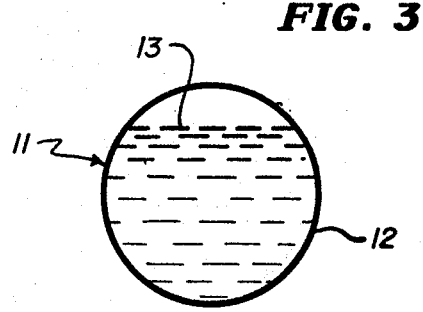
FIG. 4
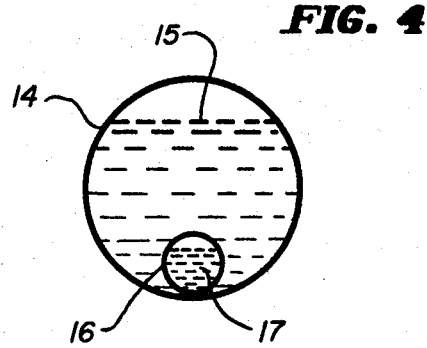
FIG. 5
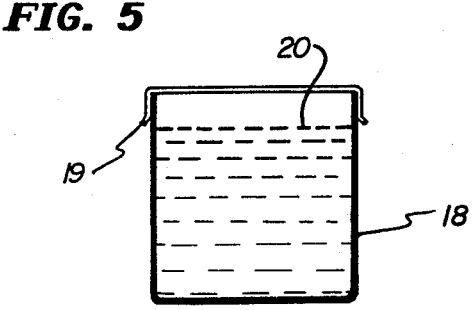
INVENTORS
Donald L. Klass
Carl D. Landahl
BY
Dominik, Knechtel & Godula
ATTYS.

United States Patent Office 3,669,637
Patented June 13, 1972

3,669,637
ODORANT REPLACEMENT IN GAS STREAMS
Donald L. Klass, Barrington, and Carl D. Landahl, Chicago, Ill., assignors to Institute of Gas Technology, Chicago, Ill.
Filed May 8, 1970, Ser. No. 35,906
Int. Cl. C01j 1/28
U.S. Cl. 48—195
16 Claims

ABSTRACT OF THE DISCLOSURE

Odor fading of odorants in gas streams is counteracted by adding odorants from an enclosed container through a permeable membrane over selected time periods. The container is preferably self-destructing after the odorant is exhausted.

---

This invention relates to a method and structure for preventing the phenomenon called "odor fading" that occurs, for example, when odorized natural gas is passed through new pipelines.

Almost all natural gas distributed for fuel and industrial use contains odorants comprised of low-molecular-weight organic sulfur compounds. These compounds are effective at very low concentrations, and warn of leaks or equipment failure. A general characteristic of these odorants is their frequent odor fading when natural gas is passed through new steel pipelines. This problem has plagued the gas industry since odorants were first used. Considerable study of the problem has been conducted by numerous companies, but to date no satisfactory solution has been proposed.

The method of the present invention employs an enclosed container or capsule which is usefully employed in such natural gas pipelines. The container holds a predetermined amount of odorant, and at least a portion of the container or capsule comprises a membrane permeable to that odorant. One or more of these containers may be placed in the new pipeline, and each container delivers a constant dose rate of odorant over a predetermined time period to the natural gas until the odorant is depleted in the container. This odorant supply may function as a supplement to the regular dosage of odorant regularly added to the natural gas stream. When the odorant is depleted, the container preferably self-destructs. It is desirable for this destruction to occur gradually so that there is no apparent effect on the fuel value or other properties of the natural gas.

Numerous membranes, membrane configurations and odorants can be used. In selecting the membrane, its parameters are preselected in conjunction with the permeation characteristics of the odorant system to provide a constant permeation rate of odorant until the container is empty. The unique feature of this concept is that permeation of the odorant proceeds at a desirably constant rate until it is exhausted. In general, the system and method is operable with confined gas streams which are intended to be provided with an odorant for detection purposes.

The odorant in the container may be a liquid or a gas, but the odorant will leave the membrane as a gas. The rate of permeation of odorant through a membrane in the steady-state can be described by a form of Fick's Law:

$$q = \frac{KA(\Delta p)}{\delta}$$

where $q$ = flow rate of odorant through the membrane, cm.$^3$ (STP)/sec.
$K$ = permeability constant, $$\frac{\text{cm.}^3 \ (STP) \ \text{cm.}}{\text{cm.}^2 \ \text{sec. cm. Hg.}}$$

$A$ = membrane area, cm.$^2$
$\Delta p$ = pressure differential of odorant across the membrane, cm. Hg
$\delta$ = thickness of membrane, cm.

The permeability constant K is a specific quantity for a given odorant and membrane, and can be determined by known methods, as set out later in the specification.

A particular membrane and a particular gas may be evaluated by considering their respective solubility parameters. The solubility of various polymers can be calculated from Hildebrand's relationship, Sheehan, C. J. and Bisio, A. L., Rubber Chem. and Tech., 39, No. 1, pp. 149-192:

$$\alpha = \left(\frac{\Delta E}{V}\right)^{1/2}$$

where:

$\alpha$ = solubility parameter
$\Delta E$ = energy of vaporization at 25° C., cal./mole
$V$ = molar volume, cm.$^3$ When an odorant and a membrane have similar solubility parameters, the permeation rate tends to be high. When the solubility parameters are dissimilar, then the permeation rate tends to be low. Either a high or a low permeation rate may be desired.

In Table 1, there are listed the solubility parameters of some representative polymers, many of which are commercially available in the form of membranes. The solubility parameters of the listed polymers range from about 6 to about 15.

TABLE 1.—SOLUBILITY PARAMETERS OF POLYMERS

| Average solubility parameter | Polymer |
|---|---|
| 6.2 | Polytetrafluoroethylene. |
| 7.3 | Silicone rubber (polydimethyl). |
| 7.52 | Poly (propylene oxide). |
| 7.8 | Poly (stearyl methacrylate). |
| 7.84 | Butyl rubber. |
| 7.94 | Polyethylene. |
| 7.95 | Ethylene-propylene copolymer. |
| 7.95 | Polyisobutylene. |
| 8.1-8.33 | Butadiene/styrene. |
| 8.1 | Polypropylene. |
| 8.1 | Natural rubber. |
| 8.2 | Poly (isoborynl acrylate). |
| 8.2 | Poly (lauryl methacrylate). |
| 8.3 | Poly (t-butyl methacrylate). |
| 8.4 | Poly (octyl methacrylate). |
| 8.44 | Polybutadiene. |
| 8.6 | Poly (hexyl methacrylate). |
| 8.7-10.30 | Butadiene/acrylonitrile. |
| 8.7 | Poly (n-butyl acrylate). |
| 8.7 | Poly (butyl methacrylate). |
| 8.8 | Poly (propyl methacrylate). |
| 8.83 | Polystyrene. |
| 8.85 | Neoprene. |
| 9.1 | Poly (ethyl methacrylate). |
| 9.3 | Poly (ethyl acrylate). |
| 9.3 | Poly (methyl methacrylate). |
| 9.35 | Butadiene/vinyl pyridine. |
| 9.4 | Chlorinated rubber. |
| 9.4 | Polyvinyl acetate. |
| 9.53 | Polydimethylsiloxane. |
| 9.55 | Polyvinyl bromide. |
| 9.57 | Polyvinyl chloride. |
| 9.7 | Poly (methyl acrylate). |
| 10.1 | Poly (chloroacrylate). |
| 10.3 | Ethyl cellulose. |
| 10.6 | Cellulose di-(nitrate). |
| 10.7 | Poly (ethylene terephthalate). |
| 10.7 | Poly (glycol terephthalate). |
| 10.9 | Cellulose di-(acetate). |
| 11.0 | Epoxy resins. |
| 11.5 | Cellulose nitrate. |
| 12.4 | Polyvinylidene chloride. |
| 13.6 | Nylon 66. |
| 14.0 | Poly (cyanoacrylate). |
| 14.5 | Polyacrylonitrile. |

An odorant which is commonly used to odorize natural gas is tert-butyl mercaptan (TBM), which is liquid at room temperature. The solubility parameter of TBM is 7.6, as calculated by the method of Small, P. S., J. Appl. Chem. 3, pp. 71–80 (1953). The rates of permeation are generally the highest where the membrane and odorant have solubility parameters which are similar. For example, this has been found generally true in the case of TBM and silicone rubber (polydimethyl form) which have solubility parameters of 7.6 and 7.3, respectively. Tests have shown that TBM has a permeation rate about 16 times larger through silicone rubber than through polyvinylchloride, which has a solubility parameter of 9.6, under the same conditions. It is therefore apparent that a wide range of TBM permeation rates are available to provide the desired rate of odorization to supplement the regular dosage added to the natural gas stream. Other odorants are also employed in this art, and they include gaseous organic compounds such as the mercaptans and sulfides, for example, ethyl mercaptan, dimethyl sulfide, isopropyl mercaptan, n-propyl mercaptan, thiophane, and still others.

The permeability factor (K) was determined by a weight loss method. A known amount of odorant was encapsulated in a membrane container of known dimension. The container was kept at ambient temperature and pressure, and periodically weighed. The experimentally determined weight loss with time was subsequently converted to a K value.

Odor fading usually persists for varying periods, up to about three months, so any membrane system should be capable of supplementing the dosage of odorant which is regularly added to the natural gas stream for a desired time period. The amount of odorant added depends on several factor, which are readily understood by those skilled in this art, such as the concentration desired, the flow rate of the stream, the rate of usage of the gas, and the like. Considering the foregoing, a membrane system was constructed to permeate TBM into a natural gas stream at a rate which would supplement the odorant regularly added, to prevent odor fading.

By way of a representative example, TBM is employed in membrane containers at a dose rate of 1.0 g. and 0.5 g. per day for a period of 60 days (sp. gr. 0.7947). The different amounts of TBM are placed in enclosed membrane capsules of spheric forms. The membranes of the capsules are silicone rubber (polydimethyl form), polyvinylchloride and gelatin. These membrane materials are selected because of their commercial availability and their range of solubility parameters. The following Table 2 shows the measured K values, or permeability of TBM. These values were determined by measuring weight loss exhibited by a membrane container of TBM.

Depolymerization can be caused by heat, light, ionizing radiation, ultrasonic energy, microorganisms, mechanical degradation, attack by oxygen, and chemicals. However, the depolymerization method selected for the membrane system will depend on the chemical structure and the properties of the polymer backbone. For example, polyoxymethylene polymers will depolymerize by residual catalyst, such as paraformaldehyde, left in the polymer. The original monomer is evolved as a gas. Polymers such as polymethylmethacrylate, on the other hand, slowly depolymerize at moderate temperatures in the absence of stabilizing agents, such as peroxide scavengers, because the polymer and intermediate molecular weight fragments are in equilibrium. It is therefore possible to slowly vaporize such materials in a flowing gas stream.

If the membrane is a water-soluble cellulosic polymer, such as carboxymethylcellulose, polyvinyl alcohol or gelatin, the membrane container can be dissolved in water and subsequently form a thin coating on a very small portion of the internal pipeline surface. The source of water can be incorporated in the odorant membrane container by use of a second water-soluble unit container filled with water within the first container filled with odorant. The water will preferably be released when the second dissolves, in a desired time sequence, and after the odorant has escaped from the first. This can be altered by adjusting the thickness of each container and the amount of water in the second container.

In summary, odor fading in confined flowing gas streams, such as natural gas pipelines, can be reduced or eliminated by adding one or more membrane containers of odorants to the pipeline. The membrane containers deliver a constant dose rate of odorant into the natural gas stream until the odorant is depleted in the container. The container then self-destructs to form, for example, gases which are carried away by the natural gas. The membrane containers can have several geometries, but the important parameters are the membrane area and thickness. These parameters are pre-selected in conjunction with the permeation characteristics of the self-destruct odorant system to provide a constant permeation rate of odorant until the container is empty. The rate of permeation is temperature-dependent and dependent upon the differential pressure of the odorant, but is independent of changes in pressure and composition of the natural gas. The average temperature of flowing gas is used to preselect the characteristics of the permeation systems.

While the membrane container described above is particularly adapted to prevent odor fading in natural gas pipelines, the same concept can be used in cylinder and tank liquid propane gas (LPG) systems. Ethyl mercaptan is a popular odorant for such systems. One of the problems in systems of this type is the fractional distillation

TABLE 2

| Type of membrane | Dose rate, gm./day | K Measured permeability, cm.$^3$ (STP) cm. / cm.$^2$ sec. cm. Hg | Calculated dimensions for spherical capsule | | | |
|---|---|---|---|---|---|---|
| | | | Dose period, days | Inside diameter, cm. | Outside diameter, cm. | Wall thickness, cm. | Effective internal area thickness ratio, cm.$^2$/cm. |
| Silicone rubber (dimethyl form) | 0.5 | $420 \times 10^{-8}$ | 60 | 4.2 | 28.6 | 12.2 | 4.5 |
| | 1.0 | $420 \times 10^{-8}$ | 60 | 5.3 | 25.3 | 10.0 | 8.8 |
| Polyvinylchloride | 0.5 | $27 \times 10^{-8}$ | 60 | 4.2 | 5.8 | 0.79 | 70.2 |
| | 1.0 | $27 \times 10^{-8}$ | 60 | 5.3 | 6.6 | 0.63 | 139.0 |
| Gelatin | 0.5 | $1.4 \times 10^{-8}$ | 60 | 4.2 | 4.3 | 0.041 | 1,350.0 |
| | 1.0 | $1.4 \times 10^{-8}$ | 60 | 5.3 | 5.4 | 0.033 | 2,650.0 |

The membrane container preferably self-destructs after the odorant is depleted, in a manner such that there is no effect on the fuel value or the characteristics of the natural gas. This self-destruct feature is incorporated into the membrane material in several different ways, one of which is the use of depolymerization agents in the polymer to cause slow evaporation of intermediate molecular weight polymers produced by the depolymerization agents, or the slow evolution of the original monomer.

of odorant and the resultant odor fading as the LPG is withdrawn. Often, the odorant is completely removed from the cylinder or tank before the LPG is exhausted. This problem is solved by the use of encapsulated LPG odorant in a permeable container which is added to the LPG cylinder or tank. By proper selection of the container membrane, area, and thickness, the odorant will permeate at a constant rate into the LPG as it is being used. Then, when the container or tank is closed, the partial pressure of the odorant outside the permeable container in the cylinder or tank increases until the resulting pressure differential of odorant across the membrane either decreases or stops further permeation. This condition will be changed when more LPG is used and odorant pressure outside the permeable container drops. The permeable odorant container, in this case, need not self-destruct, but can be recovered for reuse when the cylinder or tank is empty. It will be appreciated that other liquefied gases, such as liquefied natural gas (LNG) may be used, as well as various room temperature liquid gases.

It will be appreciated that the packages, capsules, or containers need include only a part which is a membrane permeable to the odorant, and that such containers or packages may take many geometric forms, including spheres, cubes, pyramids, toroids, obloid spheroids, and the like. The membrane packages may be variously charged with the odorant prior to deposit in the flowing stream. This may include injecting a preformed enclosed container with the odorant, filling a membrane tube and heat sealing the opposite ends, as well as still other procedures. If desired, the odorant capsules may be stored or provided with a reasonable shelf life by providing the containers with a removable, non-permeable coating, depositing the container in a second container provided with a partial pressure sufficient to prevent loss of the odorant from the first container, or by using still other methods for this purpose.

It will also be appreciated that a combination of odorant systems and containers may be employed for a particular flowing stream to attain desired operational levels. For example, the odorant packages can release the odorant at selected time periods to provide a desired time-concentration level relationship. Higher concentrations may be desirable at different times, and different odorants may be desirably introduced at different times. Still other factors may operate to prescribe a particular concentration of packages and odorant systems. In any event, each package will be characterized by a substantially constant permeation rate over a predetermined time period.

Optionally, a flexible membrane container can be used which changes in size with changing flow rates of the natural gas. In this way, the dose rate of odorant per unit volume of natural gas is also constant.

The following schematic drawing may serve to further understand the foregoing disclosure, such drawing comprising the following figures:

FIG. 1 is a schematic showing the odorant container placed in a natural glass pipe line.

FIG. 2 is a schematic showing the odorant container placed in a pressurized cylinder tank.

FIG. 3 illustrates a representative odorant container on a large scale.

FIG. 4 represents an alternative embodiment of an odorant container on a scale similar to that of FIG. 3.

FIG. 5 represents still another alternative embodiment of an odorant container on a scale similar to that of FIGS. 3 and 4.

The confining means of FIG. 1 is shown as a natural gas pipe line 5, with the direction of flowing gas stream indicated at 6. An odorant capsule 7 is deposited entirely within the pipe line in unattached relationship thereto.

A cylinder 8 is shown in FIG. 2 as an alternative embodiment of a confining means, the direction of flowing gas stream indicated by the arrow at 9. Such cylinder is conventionally fitted with operating valve closure 10. The odorant capsule 11 is deposited entirely within the cylinder in unattached relationship thereto.

The representative odorant capsule is shown generally at 11 in FIG. 3. Such capsule is provided with a self-destruct membrane of the type previously described, and liquid odorant 13 is within the capsule.

Another embodiment is shown in the view of FIG. 4 wherein a water soluble membrane is shown at 14 with liquid odorant 15 therein. Inside the membrane is another capsule comprising a water soluble membrane 16 containing water 17 therein. The parameters of the respective membranes are such that following substantial permeation of the odorant 15, membrane 16 will be dissolved and water 17 will then dissolve or otherwise destroy membrane 14.

FIG. 5 shows still another alternative embodiment of the odorant container wherein one portion 18 is a non-membrane force, and another portion 19 is the gas permeable membrane, which may be secured in various ways to the part 18. The liquid odorant 20 is indicated within non-membrane part 18.

What is claimed is:

1. A system for counteracting odor fading in confined gas streams, including
    confining means for a gas stream, a container present in the confined gas stream, said container being entirely within said confining means in unattached relationship, said container including a detectable odorant and comprising at least, in part, a membrane permeable to said odorant, and said membrane allowing said odorant to undergo a substantially constant permeation rate for a predetermined time period.

2. A system as in claim 1 wherein the gas stream is natural gas in a pipeline.

3. A system as claimed in claim 2 comprising an odorant and membrane having substantially similar solubility parameters to attain high permeation rates.

4. A system as in claim 2 comprising an odorant and membrane having dissimilar solubility parameters to attain low permeation rates.

5. A system as claimed in claim 2, wherein the membrane has a solubility parameter from about 6 to about 15, and the confined gas stream is liquefied propane gas.

6. An odorant container for releasing odorants in gas streams, including an enclosed container, at least a part of said container being a gas-permeable membrane, an agent in the container to cause said membrane to self-destruct over a predetermined time period, and said membrane allowing said odorant to undergo a substantially constant permeation rate for a predetermined time period prior to destruction.

7. An odorant container as in claim 6, wherein the membrane is self-destructive to water, said membrane being selected from the class consisting of water soluble cellulosic polymers, polyvinyl alcohol and gelatin, and said container having separately contained water releasable to destroy said membrane.

8. An odorant container as in claim 6 wherein said odorant is tert-butyl mercaptan and wherein such gas stream is natural gas.

9. An odorant container as in claim 6, wherein said odorant is within a first membrane container, said destructing agent is in a second container positioned within said first container, and said destructing agent destroys both containers in timed sequence over a predetermined time period following contact with said destructing agent.

10. An odorant container as in claim 6, wherein the membrane is a polymer and the self-destruct agent is a depolymerizing agent which breaks the polymer material into smaller polymer units.

11. A method for adding an odorant to a confined gas stream which includes the steps of depositing entirely within confining means for the said gas stream in unattached relationship to the said confining means a container having therewithin an odorant at least a portion of said container being a gas permeable membrane and retaining said container within said gas stream until the odorant is exhausted at substantially constant permeation rates over a predetermined time period.

12. A method which includes the steps of claim 11 above, wherein said odorant is tert-butyl mercaptan, said membrane has a solubility parameter from about 6 to about 11, and wherein said gas stream is liquefied natural gas.

13. A method as in claim 11 wherein said confined gas stream is natural gas in a pipeline.

14. A method which includes the steps of claim 11 above, which further includes exposing said membrane to a destructing agent after said odorant has substantially completed permeation through said membrane.

15. A method which includes the steps of claim 14 above, wherein said self-destructing agent is made a part of said membrane.

16. A method which includes the steps of claim 14 above, wherein said self-destructing agent is separated from the membrane until the odorant is exhausted.

References Cited
UNITED STATES PATENTS

| | | | |
|---|---|---|---|
| 3,169,839 | 2/1965 | Calva | 48—195 |
| 3,083,861 | 4/1963 | Amberg et al. | 220—44 A |
| 3,507,708 | 4/1970 | Vignaud | 220—44 A |
| 3,112,189 | 11/1963 | Elliott | 48—195 |

MORRIS O. WOLK, Primary Examiner

D. G. MILLMAN, Assistant Examiner

U.S. Cl. X.R.

137—3; 220—44 R; 261—104

Disclaimer 3,669,637.—*Donald L. Klass*, Barrington, and *Carl D. Landahl*, Chicago, Ill. ODORANT REPLACEMENT IN GAS STREAMS. Patent dated June 13, 1972. Disclaimer filed Jan. 12, 1973, by the assignee, *Institute of Gas Technology*.

Hereby disclaims the portion of the term of the patent subsequent to Jan. 11, 1989.

[*Official Gazette March 13, 1973.*]